(No Model.)
W. LIPPERT.
PROCESS OF AND APPARATUS FOR AERATING WATER USED IN BATHS.
No. 523,220. Patented July 17, 1894.
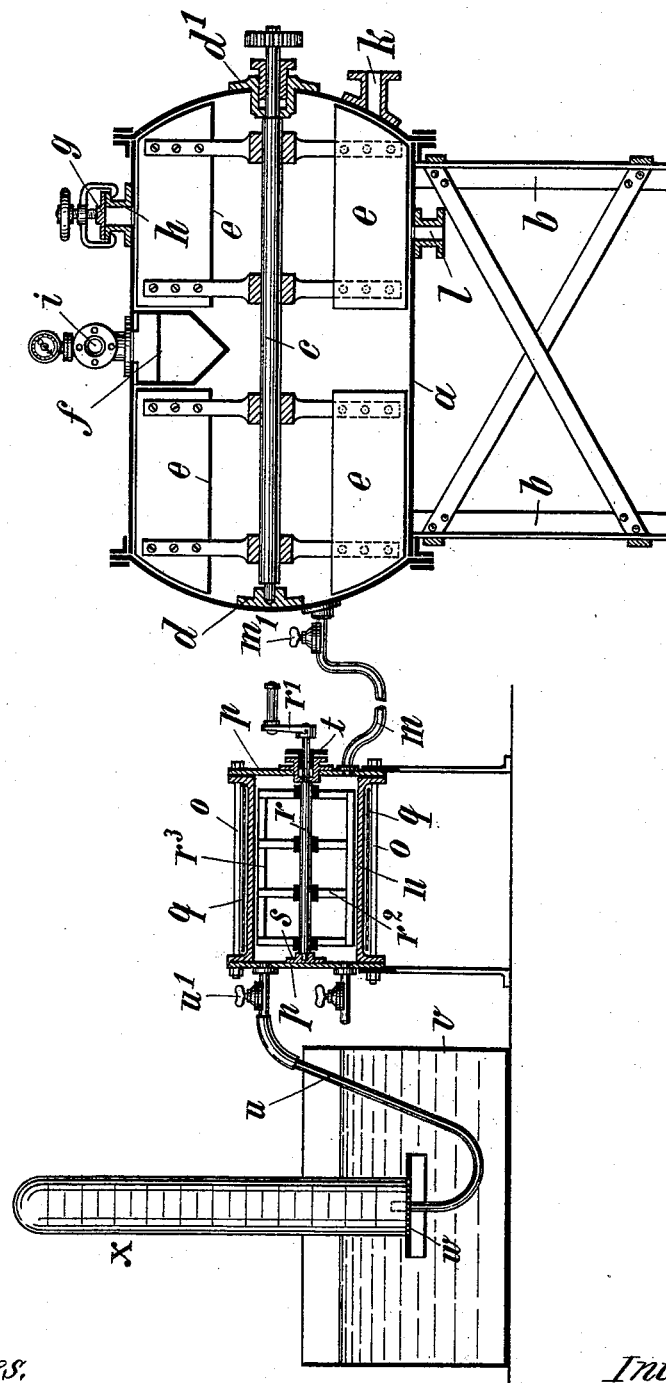

UNITED STATES PATENT OFFICE.

WILHELM LIPPERT, OF DRESDEN, GERMANY.

PROCESS OF AND APPARATUS FOR AERATING WATER USED IN BATHS.

SPECIFICATION forming part of Letters Patent No. 523,220, dated July 17, 1894.

Application filed January 21, 1893. Serial No. 459,244. (No model.)

*To all whom it may concern:*

Be it known that I, WILHELM LIPPERT, a subject of the Emperor of Germany, residing at Dresden, in the Kingdom of Saxony, Germany, have invented certain new and useful Improvements Relating to the Aeration of Water for Use in Baths and to Apparatus Connected Therewith, of which the following is a specification.

My invention relates to a method of aerating water for use in baths and to apparatus connected therewith. According to the aforesaid method I add certain substances to the mixture of the water and carbonic acid to retard the escape of the latter from the bathing tub. For this purpose I preferably use slippery substances which are wholly or partly soluble in the water, such as green or excessively fat soap, but vegetable oils, such as olive oil or the like, may also be employed. The action of these substances is such that in the mixing of carbonic acid and water they prevent the formation of froth in a similar manner as the waves of the sea are allayed by oil. By this means I effect on the one hand the saturation of the water with carbonic acid and prevent on the other hand, owing to the fact that all the strata of the mixture are at rest, a premature escape of carbonic acid, whereas the collapse of any bubbles, in consequence of the shaking of the neighboring parts, would promote the disengagement of the carbonic acid. Moreover the addition of soap or the like, increasing the adhesion of the particles of water, retards also the rising of bubbles of carbonic acid which may have become free.

The improved apparatus which I employ has for its object to perform the mixing of water and carbonic acid in an effectual manner and with less expenditure of power than has been the case with the apparatus heretofore employed for similar purposes. Provision has been made in this apparatus for enabling any person to ascertain with perfect certainty the quantity of carbonic acid contained in the mixture.

This apparatus, a vertical section of which is represented in the accompanying drawing, comprises a cylindrical mixing vessel $a$ held upon a frame $b$, and receiving in its interior an agitator shaft $c$ supported at one end in a bearing $d$ and at the other end in a stuffing box $d'$. The said shaft is provided with vanes $e$ which however do not extend in the axial direction quite through the vessel, but leave in the middle of the latter a free cylindrical space. Into this space extends in the radial direction a spade-shaped vane $f$ arranged on the periphery of the vessel $a$. This vane is designed to prevent the water following the circular motion of the vanes $e$ in the rotation of the agitator shaft $c$ but produces, in consequence of the resistance offered to this motion, a kind of churning action on the particles of water, thereby considerably facilitating the penetration of the carbonic acid into all parts of the water. Owing however to the fact that green soap or the like is added to the water in the mixing vessel $a$ the formation of froth, which is disadvantageous to the impregnation of the water with carbonic acid, is not caused by the action of the agitator shaft $c$. For this purpose it is however needful to provide for letting off the air forced from the water by the carbonic acid, which is suitably effected through the same tubulure $h$ through which the soap or the like is introduced and which is usually closed by means of a lid $g$ adapted to be screwed down.

The carbonic acid is introduced through a tubulure $i$ into the mixing or saturating vessel $a$, and the water through a tubulure $k$, while the water which is ready for bathing is conducted through a tubulure $l$ to the bathing tub. The mixing vessel is connected by a tube $m$ with a device for ascertaining the quantity of carbonic acid contained in the bathing water. This device consists essentially of a hollow cylinder $n$ which is preferably made of transparent material and closed at its ends by means of a cover $p$ adapted to be fixed by means of rods $o$. For the sake of safety the hollow cylinder $n$ is surrounded by wire work $q$. In the axis of the hollow cylinder $n$ is moreover arranged an agitator shaft $r$, which, similarly to the shaft in the mixing vessel, is supported at one end in a bearing $s$ of one of the covers, while the other end extending through a stuffing box $t$ of the second cover, carries a crank $r'$. The several agitator arms $r^2$ are of a very small width, and their free ends are connected by bars $r^3$. When a cock or valve $m'$ in the tube $m$ is opened a portion of the water containing carbonic acid passes into the hollow cylinder $n$, experiencing a reduction of pressure which enables the carbonic acid to pass out. When the agitator shaft $r$ is then set in operation the arms produce a kind of whipping action on the water saturated with carbonic acid, causing the carbonic acid to pass out. The carbonic acid which has left is conducted through a pipe $u$ adapted to be closed by means of a cock or valve $u'$ into a receptacle $v$ containing a solution of sodium chloride. To the pipe $u$, bent upward within the solution of sodium chloride, is joined a perforated plate $w$ upon which I place a glass cylinder $x$ which is open at the lower end and closed at the upper end, and contains a solution of sodium chloride. The carbonic acid entering the glass cylinder on the opening of the cock or valve $u'$ will then gradually displace the liquid, and the quantity of the carbonic acid which has taken the place of the latter can be ascertained by the aid of a graduated scale provided on the glass cylinder $x$. Suppose the capacity of the glass cylinder represents a definite measure, for instance two liters, and the graduations on the glass cylinder also correspond to definite portions of a liter, the percentage of carbonic acid of the bathing water may be easily determined. The figures giving the percentage may however be provided immediately by the side of the graduations.

Green soap and vegetable oils are employed in this invention, instead of glycerine, by reason of the fact that the hygroscopic quality of the latter and its tendency to combine with acids, render it unsuitable for the purposes described.

What I claim is—

1. The method herein described for producing aerated water for bathing, which consists in mingling water with green soap, or its described equivalent, and then forcing carbonic acid gas into the water, substantially as described.

2. An apparatus for aerating water for bathing and ascertaining the quantity of carbonic acid gas therein, consisting of a closed vessel, an agitator arranged therein and provided with vanes which are separated from the axis, a spade-shaped vane $f$, a closed receptacle containing water that has been aerated, an agitator arranged in said receptacle, a pipe to carry off the liberated gas, and a glass cylinder open at its lower end and containing sodium chloride, the end of the said pipe being inserted in the open end of said cylinder, substantially as described.

In testimony that I claim the foregoing as my invention I have signed my name, in presence of two witnesses, this 31st day of December, 1892.

WILHELM LIPPERT.

Witnesses:
HERNANDO DE SOTO,
WOLDEMAR WAGNER.